(12) United States Patent
Steen et al.

(10) Patent No.: US 7,347,804 B2
(45) Date of Patent: Mar. 25, 2008

(54) AUTOMATIC ENGAGING/DISENGAGING METHOD OF A COUPLING-INDEPENDENT POWER TAKE-OFF

(75) Inventors: Marcus Steen, Angered (SE); Lars Bråthe, Göteborg (SE); Anders Eriksson, Göteborg (SE)

(73) Assignee: Volvo Lastvagnar AB, Gothenburg (DE)

( * ) Notice: Subject to any disclaimer, the term of this patent is extended or adjusted under 35 U.S.C. 154(b) by 0 days.

(21) Appl. No.: 10/907,823

(22) Filed: Apr. 16, 2005

(65) Prior Publication Data
US 2006/0283273 A1   Dec. 21, 2006

Related U.S. Application Data

(63) Continuation of application No. PCT/SE03/01390, filed on Sep. 8, 2003, now abandoned.

(30) Foreign Application Priority Data
Oct. 16, 2002   (SE) .................................. 0203067

(51) Int. Cl.
*B60W 10/02*   (2006.01)
*F16H 37/00*   (2006.01)
(52) U.S. Cl. ........................ 477/77; 74/15.84
(58) Field of Classification Search ............... 477/77, 477/78, 79, 167, 174, 180; 74/15.63, 15.66, 74/15.84; 701/53, 54; 180/53.1, 53.7, 53.8
See application file for complete search history.

(56) References Cited

U.S. PATENT DOCUMENTS

| | | | |
|---|---|---|---|
| 5,203,440 A * | 4/1993 | Peterson et al. ............ 477/171 |
| 5,299,129 A | 3/1994 | Uchida et al. |
| 5,314,038 A * | 5/1994 | Peterson, Jr. ............... 180/274 |
| 5,557,977 A * | 9/1996 | Stockton .................... 74/15.84 |
| 5,562,173 A * | 10/1996 | Olson ........................ 180/53.4 |
| 5,611,751 A | 3/1997 | Ehrenhardt et al. |
| 6,080,081 A | 6/2000 | Sauermann et al. |
| 6,517,465 B2 * | 2/2003 | Hrazdera .................... 477/174 |
| 6,830,118 B2 * | 12/2004 | Koelle et al. .............. 180/65.2 |

FOREIGN PATENT DOCUMENTS

| | | | | |
|---|---|---|---|---|
| DE | 10059708 A1 | 7/2001 | | |
| JP | 363028730 A * | 2/1988 | .................. 477/167 |

\* cited by examiner

*Primary Examiner*—Roger Pang
(74) *Attorney, Agent, or Firm*—Novak Druce + Quigg, LLP

(57) ABSTRACT

Automatic engaging method (and disengaging method) for a coupling-independent power take-off (32), which power take-off (32) is driven by an internal combustion engine (1) arranged in a vehicle. The vehicle is equipped with an automatic stage-geared gearbox (9) and an automated disk clutch (3). The control unit (45) registers that engagement of he power take-off (32) is requested; the control unit (45) disengages the disk clutch (3); the control unit (45) reduces the engine speed or stops the engine (1); the control unit (45) engages the power take-off (32); the control unit (45) couples the disk clutch (3) together or, if the engine (1) is stopped, starts the engine (1) and couples the disk clutch (3) together.

11 Claims, 4 Drawing Sheets

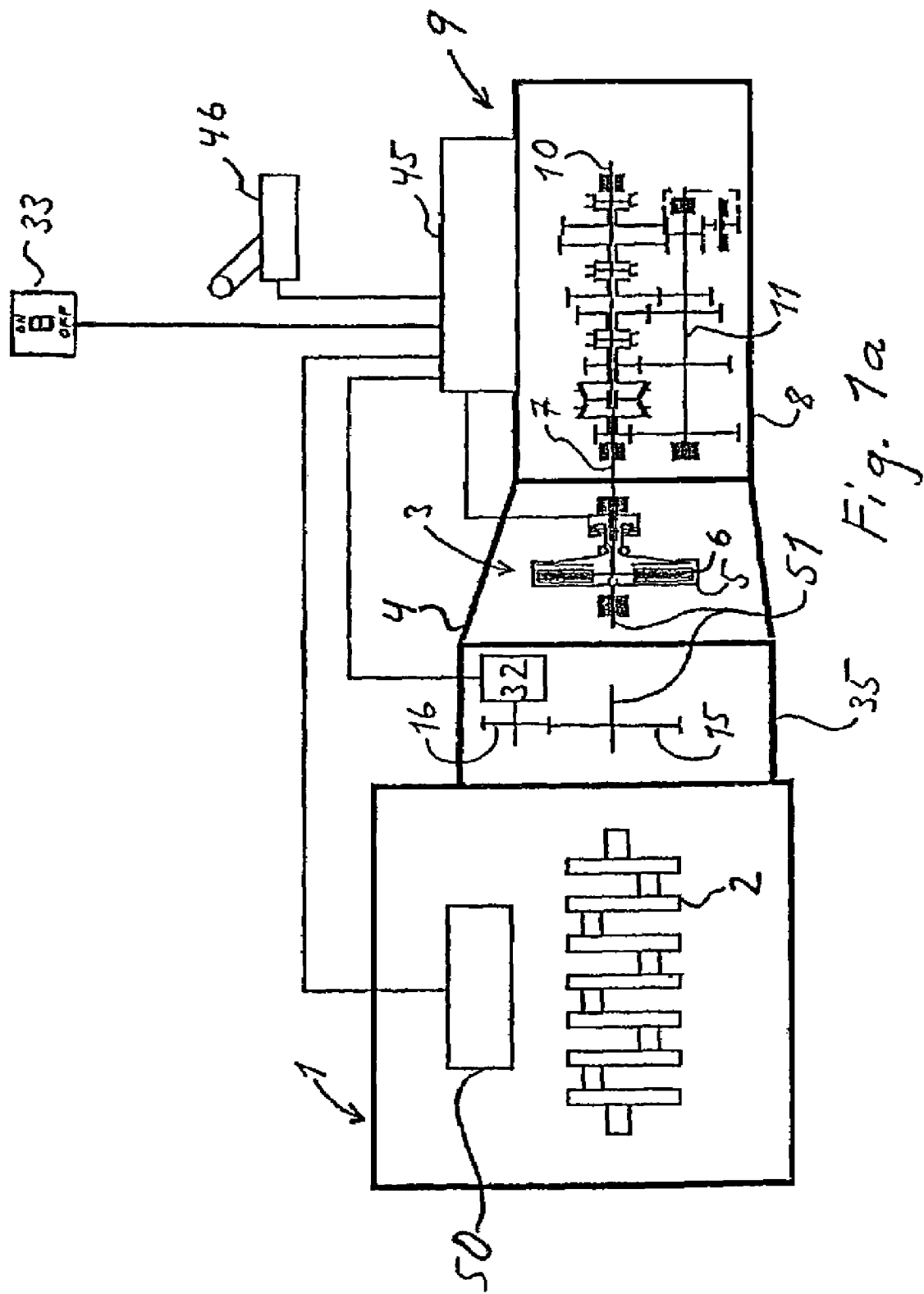

AUTOMATIC ENGAGING/DISENGAGING METHOD OF A COUPLING-INDEPENDENT POWER TAKE-OFF

CROSS-REFERENCE TO RELATED APPLICATIONS

The present application is a continuation patent application of International Application No. PCT/SE2003/001390 filed 8 Sep. 2003 which was published in English pursuant to Article 21(2) of the Patent Cooperation Treaty, and which claims priority to Swedish Application No. 0203067-4 filed 16 Oct. 2002. Said applications are expressly incorporated herein by reference in their entireties.

FIELD OF THE INVENTION

The present invention relates to motor vehicles, and more particularly to a method and arrangement for automatically engaging and disengaging a coupling-independent power take-off arranged at, and driven by the engine of the vehicle.

BACKGROUND OF THE INVENTION

In order for it to be possible to handle the load on a truck effectively, load-handling equipment is necessary. Examples of such equipment is tipping gear and cranes. Also common are hook loaders, refuse-handling units, rotating cement mixers, flushing units and air compressors for loading or unloading bulk loads.

In order to utilize the driving power of the vehicle engine to drive the load-handling equipment, a power take-off is required. The driving power from the power take-off can be transmitted mechanically via a either propeller shaft or belts, or hydraulically using a hydraulic pump that is mounted on the power take-off.

Power take-offs are divided into coupling-independent and coupling-dependent power take-offs. The speed and power of the coupling-independent power take-offs follow the vehicle engine irrespective of whether the vehicle is being driven or is stationary. Coupling-independent power take-offs are suitable for load handling equipment which is used when the vehicle is being driven, for example refuse-handling units, cement mixers, refrigerating/freezing units and snowplows.

The coupling-independent take-offs can be mounted on the engine of the vehicle or mounted between the engine and gearbox of the vehicle but in front of (on the engine side) the disk clutch that is arranged between the engine and the gearbox.

Automatic gearboxes of the automated stage-geared gearbox type have become increasingly common in heavy-duty vehicles as microcomputer technology has further developed, making it possible, with a control computer and a number of actuators, for example servo motors, to precision-regulate engine speed, engagement and disengagement of an automated disk clutch between the engine and the gearbox and also the internal coupling means of the gearbox in such a way and in relation to one another that gentle shifting is always obtained at the correct engine speed.

The advantage of this type of automatic gearbox compared with a conventional automatic gearbox constructed with planetary gear stages and with a hydrodynamic torque converter on the input side is on the one hand that, especially as far as use in heavy-duty vehicles is concerned, it is more simple and robust, and can be manufactured at a considerably lower cost than the conventional automatic gearbox. On the other hand, that it has higher efficiency, which also means lower fuel consumption.

Traditionally, in the abovementioned types of automated stage-geared gearbox, the following happens when the driver of the vehicle wishes to engage a coupling-independent power take-off, equipped with a disk clutch for engaging/disengaging the power take-off, in order, for example, to drive a cement mixer arranged on the vehicle. Since vehicle's equipped with such gearboxes usually do not have a disk clutch pedal, the driver has to start by putting the gearbox in neutral position by means of a gear selector arranged in the vehicle and then insure that the engine goes to its idling speed in order to minimize (as far as possible) wear on the disk clutch of the power take-off. An alternative is to stop the engine completely, which the driver is compelled to do in cases where the engaging/disengaging device of the power take-off is of the claw coupling type. With a claw coupling, the engine must be stationary in order to avoid the claw coupling being damaged and scraping noise from occurring. The next step is that the driver engages the power take-off by means of a control arranged in the vehicle for controlling the power take-off. If the engine has been stopped, the driver must then restart the engine in this state. Finally, the driver adjusts the rotational speed of the power take-off by selecting the correct engine speed. The latter operation is normally carried out by means of a throttle control arranged in the vehicle.

The driver of a vehicle with a power take-off of previously-known design has to carry out a number of steps before the power take-off can ultimately be activated. This takes time, and may cause handling problems for the inexperienced driver.

A need therefore exists in a vehicle equipped with a coupling-independent power take-off and an automated stage-geared gearbox to simplify operations for the driver of the vehicle when he wishes to use the coupling-independent power take-off of the vehicle.

SUMMARY OF THE INVENTION

The present invention is designed to alleviate the drawbacks and deficiencies described above associated with existing vehicles equipped with coupling-independent power take-offs. More particularly, one embodiment of the invention takes the form of an automatic engaging method and an automatic disengaging method for a coupling-independent power take-off which is driven by an internal combustion engine arranged in a vehicle. The internal combustion engine is connected to an automatic stage-geared gearbox via an automated disk clutch and at least one control unit is arranged in the vehicle for controlling the gearbox, the disk clutch and the internal combustion engine.

In the case of the engaging method, the invention is characterized by the following steps: the control unit registers via a control, coupled to the control unit, for controlling the power take-off that engagement of the power take-off is requested; the control unit disengages the disk clutch or the control unit selects a neutral position in the gearbox; the control unit controls the rotational speed of the engine to idling speed or virtually idling speed or at least reduces the engine speed or stops the engine; the control unit engages the power take-off; the control unit couples the disk clutch together or, if the gearbox has been put in a neutral position, reengages a gear or, if the engine is stopped, starts the engine before the coupling-together of the disk clutch or engagement of a gear takes place, or, on condition that the vehicle is moving at sufficient speed and the correct gear is engaged, the control unit starts the engine by engaging the disk clutch.

In the case of the disengaging method, the invention is characterized by these following steps: the control unit registers via a control, coupled to the control unit, for controlling the power take-off, that disengagement of the power take-off is requested; and the control unit disengages the power take-off.

An advantage of the engaging/disengaging method of the present invention is that it is easier, and in most cases quicker for the driver to engage and disengage the power take-off. Moreover, the load on the engaging/disengaging device (disk clutch or claw coupling) of the power take-off will be minimized. Furthermore, the power take-off is engaged or disengaged with only one manipulation.

In a first preferred embodiment of the method performed according to the invention, the control unit is arranged so as, after engagement of the power take-off has been performed, to adapt the rotational speed of the engine taking account of the power take-off and/or taking account of equipment driven by the power take-off. This embodiment is suitable primarily for stationary vehicles.

One advantage of the method according to this embodiment of the invention is that, as the control system knows in advance which type of power take-off and/or which type of equipment is coupled on to the power take-off, the engaging and disengaging method can be optimized, for example as far as rotational speed is concerned.

In a second preferred embodiment of the method according to the invention, the control unit is arranged so as, after engagement of the power take-off has been performed, to adapt the rotational speed of the engine taking account of the speed of the vehicle and the ratio of the gearbox.

The advantage of this is that minimum loading can be obtained on the disk clutch, arranged between the engine and the gearbox, when it is engaged.

BRIEF DESCRIPTION OF THE DRAWINGS

The present invention will be described in greater detail below with reference to the accompanying drawings, which, for the purpose of exemplification, show further preferred embodiments of the invention.

FIG. 1a shows a diagrammatic representation of an internal combustion engine with adjacent power take-off, disk clutch and gearbox;

DETAILED DESCRIPTION

Figure 1B:
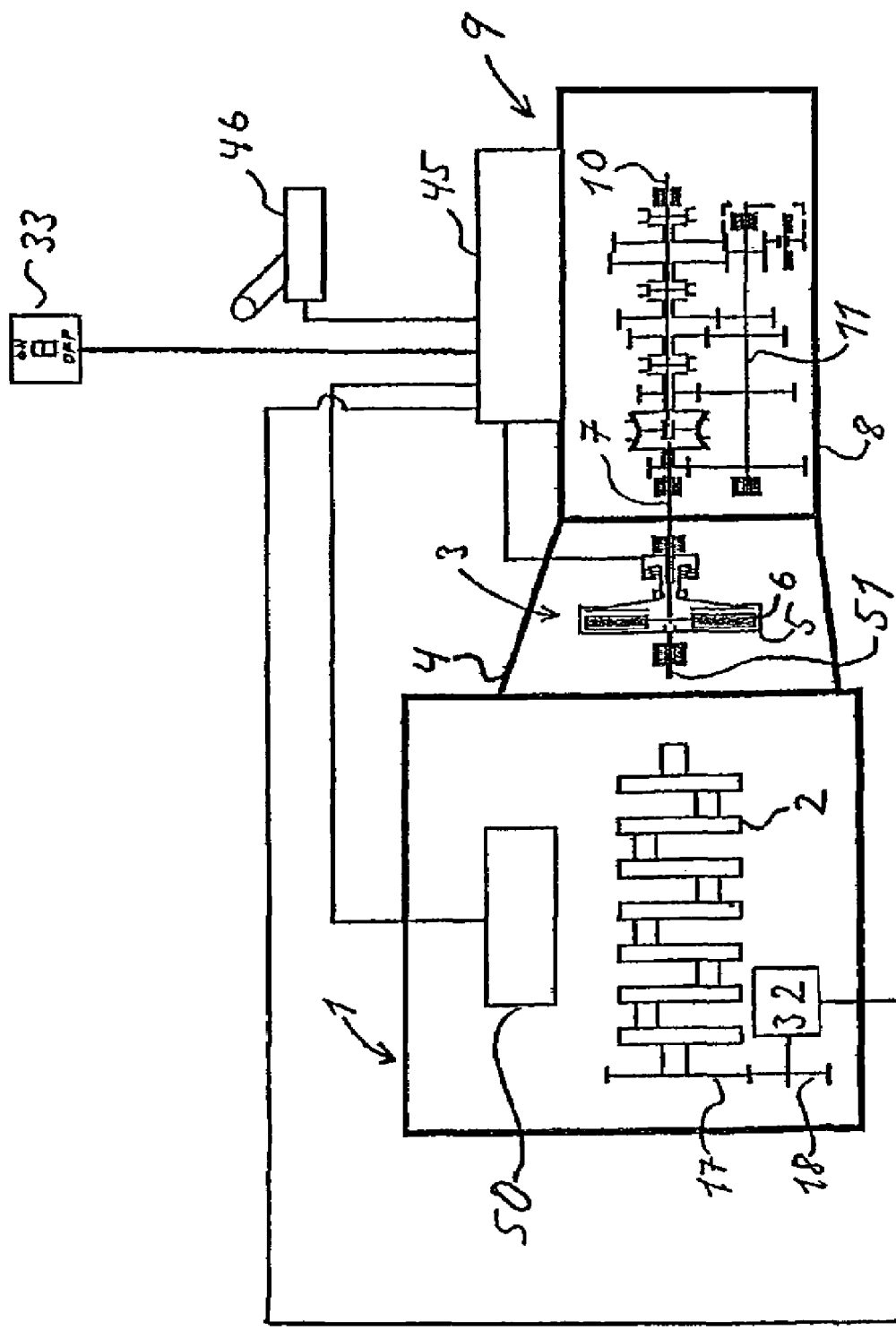
FIG. 1b shows a diagrammatic representation of an internal combustion engine with adjacent disk clutch, gearbox and a power take-off arranged directly on the internal combustion engine.

In FIG. 1a, a six-cylinder internal combustion engine 1 is exemplified as a diesel engine having crankshaft 2 coupled to a single-plate dry disk clutch 3 which is enclosed in a clutch case 4. The crankshaft 2 is, via the output shaft 51 of the engine (typically shaft 51 being connected to the flywheel, but which is not shown), connected non-rotatably to the clutch housing 5 of the clutch 3, while its plate 6 is connected non-rotatably to an input shaft 7 which is mounted rotatably in the casing 8 of a gearbox designated generally by reference number 9. A main shaft 10 and an intermediate shaft 111 are also mounted rotatably in the casing 8. Arranged between the engine 1 and the clutch case 4 is an intermediate housing 35 with a gearwheel 15 arranged in a fixed manner on the output shaft 51.

This gearwheel 15 drives, via another gearwheel 16, a shaft which constitutes the input shaft to a power take-off designated by reference number 32.

FIG. 1b shows an alternative embodiment which corresponds to the embodiment shown in FIG. 1a, apart from the fact that the intermediate housing 35 with gearwheels is absent and the power take-off 32 is instead driven by the gear transmission of the engine 1 which is designated by reference numbers 17 and 18.

A stage-geared gearbox 9 is usually constructed from an input shaft 7, an intermediate shaft 11, which has at least one gearwheel in engagement with a gearwheel on the input shaft 7, and a main shaft 10 with gearwheels which engage with gearwheels on the intermediate shaft 11. The main shaft 10 is then also connected to an output shaft coupled to the driving wheels via, for example, a propeller shaft. Each pair of gearwheels has a different ratio compared with another pair of gearwheels in the gearbox. Different gears are obtained by different pairs of gearwheels transmitting the torque from the engine 1 to the driving wheels.

Arranged in the gearbox 9 are servo devices (not shown) which can, for example, be pneumatically operated piston/cylinder arrangements of the type used in a gearbox of the type described above and which is marketed under the tradename, I-SHIFT.

The servo devices are controlled by an electronic control unit 45, comprising (including, but not necessarily limited to) a microcomputer, depending on signals fed into the control unit representing various engine and vehicle data. Examples of such data is information representative of least engine speed, vehicle speed, throttle pedal position and, where appropriate, engine brake on/off status, and whether an electronic gear selector 46, coupled to the control unit 45, is in its automatic shifting position. When the selector is in the position for manual shifting, shifting takes place at the command of the driver via the gear selector 46. The control unit 45 selects the ratio by means of the servo devices.

The control unit 45 requests engine speed and/or engine torque from the engine control unit 50 which controls the fuel injection.

Figure 2:
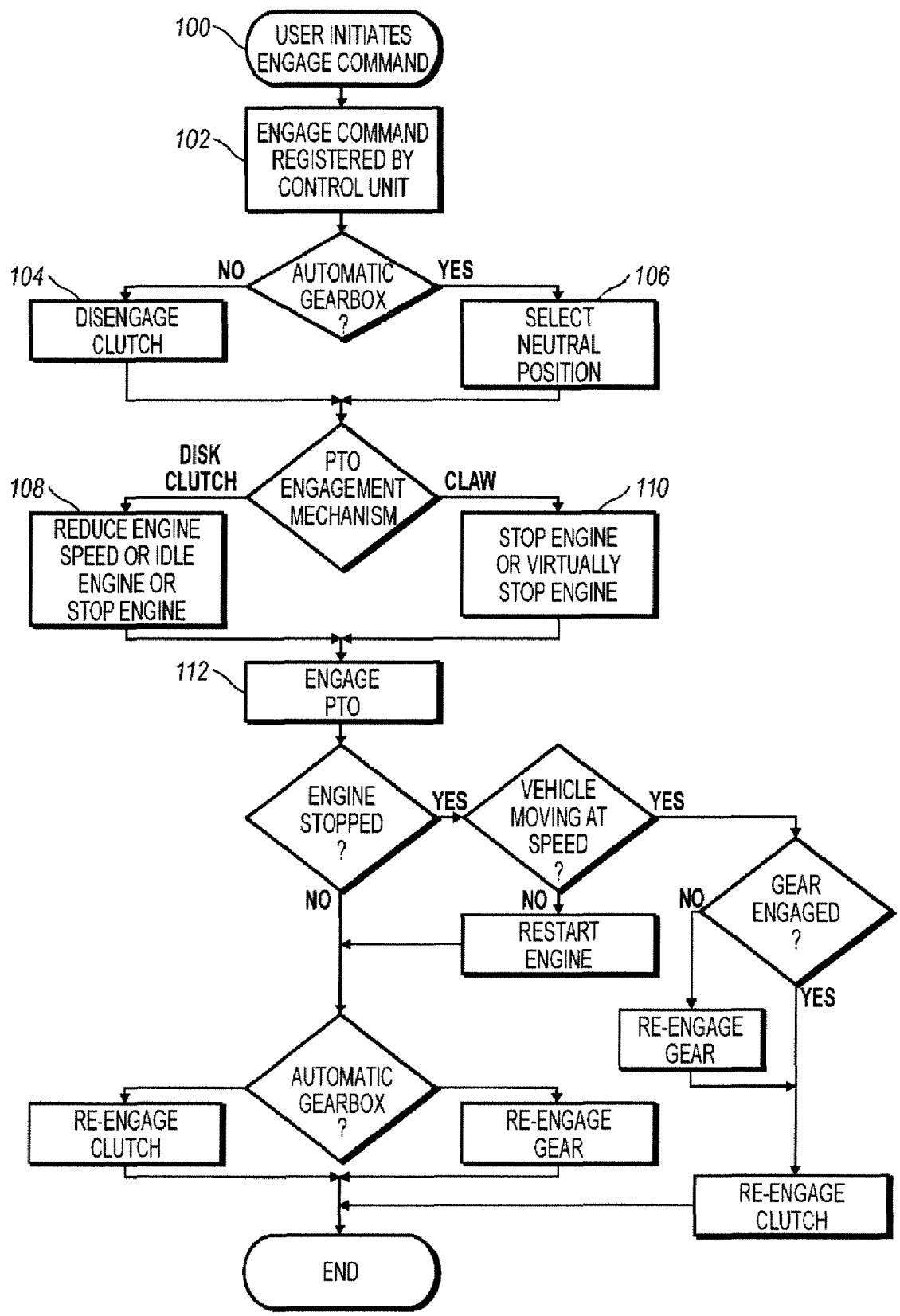
FIG. 2 is a flowchart representation of power take-off engagement according to the invention.
Figure 3:
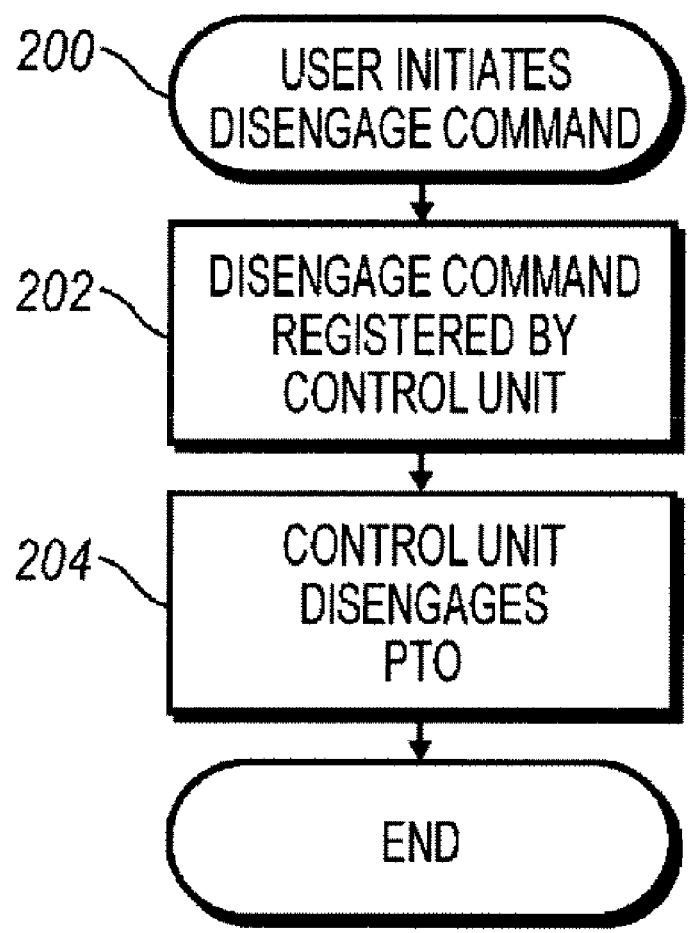
FIG. 3 is a flowchart representation of power take-off disengagement according to the invention.

The power take-off 32 itself usually consists of a housing mounted on the intermediate housing 35, or alternatively on the engine block. By means of an engaging and disengaging device (not shown), the input shaft of the power take-off can be connected in a rotationally fixed manner to the output shaft 51 of the engine according to the embodiment in FIG. 1a, or to the crankshaft 2 according to the embodiment in FIG. 1b. In both embodiments, the engaging and disengaging device of the power take-off is controlled by the control unit 45. The driver of the vehicle requests engagement 100 (FIG. 2) and disengagement 200 (FIG. 3) of the power take-off 32 by means of a control 33 for controlling the power take-off 32, which control 33 is connected to the control unit 45. When the power take-off 32 is engaged, it is therefore driven by the engine 1. The power take-off 32 can be equipped with one or more gearing possibilities on the at least one output shaft (not shown) of the power take-off. The unit(s) which is to be driven in such a manner is coupled to the output shaft of the power take-off.

According to the invention, the control unit 45 is programmed so that, when the control unit 45 receives an input signal from the control 33 indicating that the power take-off 32 is to be engaged (102), the control unit 45 disengages the disk clutch 3 (104) and preferably controls the engine speed to the idling speed of the engine 1. Otherwise, if the gearbox 9 is of the automatic type, the control unit 45 selects a neutral position (106) in the gearbox 9, If the engaging and disengaging device (not shown) of the power take-off 32 is of the disk clutch type, it is possible to engage the power take-off 32 without reducing the engine speed. The disadvantage of this, however, is that the disk clutch of the power take-off 32 is worn unnecessarily as there is a relatively great speed difference between the engine 1 and the power take-off, the rotational speed of which in this state is normally zero. Therefore, at least a reduction of the engine speed takes place or, as already mentioned, the engine speed is reduced down to the idling speed of the engine 1 (108). If the engaging and disengaging device of the power take-off 32 is of the claw coupling type, the engine 1 is stopped so that the engine speed is zero, or virtually zero (110). This is required to avoid the gear teeth in the claw coupling from being damaged and to avoid scraping noise. Stopping the engine 1 also works when the engaging and disengaging device of the power take-off 32 is of the disk clutch type (108).

When the control system 45 has registered that the rotational speed of the engine 1 is adapted, the power take-off 32 is engaged by the control unit 45 via the engaging and disengaging device (not shown) of the power take-off (112).

According to an advantageous embodiment of the invention, the control unit 45 is programmed so as, after engagement of the power take-off 32, to control the rotational speed of the engine 1 (not specifically shown on the flowchart of FIG. 2) taking account of the power take-off 32 and/or taking account of equipment (not shown) driven by the power take-off 32, if appropriate via a torque control procedure. This embodiment is most suitable when the vehicle is stationary.

In another advantageous embodiment of the invention, the control unit 45 is programmed so as, after engagement of the power take-off 32, to control the rotational speed of the engine 1 (not specifically shown on the flowchart of FIG. 2) taking account of the speed of the vehicle and taking account of the current ratio in the gearbox, if appropriate via a torque control procedure, so that minimum slip is obtained in the disk clutch 3 when the control unit 45 subsequently reengages the disk clutch 3.

If the engaging and disengaging device of the power take-off is of the claw coupling type, the rotational speed of the engine 1 is adapted by the engine 1 being stopped. When the rotational speed of the engine 1 is zero or virtually zero, the claw coupling of the power take-off 32 is coupled together. The control system 45 then starts the engine 1 before adaptation of the engine speed taking account of the power take-off 32 and/or taking account of equipment driven by the power take-off 32, if appropriate, via a torque control procedure. An alternative embodiment is to allow the vehicle to start the engine 1 by coupling the disk clutch 3 together. In order to start the engine 1 by engaging the disk clutch 3, it is necessary that the vehicle be moving forward with sufficient speed and that the correct ratio in the gearbox 9 is selected.

According to the invention, disengagement of the power take-off 32 takes place by the control unit 45 first registering that disengagement via the control 33 is requested. The control unit 45 disengages the power take-off 32 by means of the engaging and disengaging device of the power take-off 32. The disk clutch 3 does not necessarily have to be disengaged when disengagement of the power take-off 32 takes place.

According to the present invention, engagement and disengagement of the disk-clutch-independent power take-off 32 are independent of the speed of the vehicle.

In a further embodiment of the invention, the driver of the vehicle can advantageously be provided with feedback about the engaging/disengaging function of the power take-off 32 by means of an indicator lamp and/or information on a display or another information device connected to the vehicle.

It should be appreciated that the present invention is not intended for coupling-independent power take-offs which do not have a disengagement possibility.

What is claimed is:

1. An automatic engaging method for a coupling-independent power take-off (32), which power take-off (32) is driven by an internal combustion engine (1) arranged in a vehicle, which internal combustion engine (1) is connected to an automatic stage-geared gearbox (9) via an automated disk clutch (3), at least one control unit (45) being arranged in the vehicle for controlling the gearbox (9), the disk clutch (3) and the internal combustion engine (1), the engaging method comprising the steps of:

registering on the control unit (45), via a control (33) coupled to the control unit (45), that engagement of the power take-off (32) is requested for controlling the power take-off (32);

via the control unit (45), disengaging the disk clutch (3) or selecting a neutral position in the gearbox;

controlling the rotational speed of the engine (1), using the control unit (45), to one of the following states: reduced engine speed, idle speed, virtually idle speed, and stopped;

engaging the power take-off (32) using the control unit (45); and using the control unit (45), controlling the disk clutch (3) according to the following alternative conditions: if the gearbox has been put in a neutral position, reengaging a gear; if the engine (1) is stopped, starting the engine (1) before coupling-together of the disk clutch (3) or engagement of a gear; and if the vehicle is moving at sufficient speed and the correct gear is engaged, staffing the engine (1) by engaging the disk clutch (3).

2. The automatic engaging method for a coupling-independent power take-off (32) as recited in claim 1, further comprising at least one of the following steps:

adapting, after engagement of the power take-off (32) has been performed, the rotational speed of the engine (1) using the control unit (45) and taking account of at least one of the power take-off (32) and the equipment driven by the power take-off (32); and starting the engine (1) if the engine (1) is stopped and then adapting the rotational speed of the engine (1) using the control unit (45) and taking account of at least one of the power take-off (32) and the equipment driven by the power take-off (32).

3. The automatic engaging method for a coupling-independent power take-off (32) as recited in claim 2, wherein the control unit (45) adapts the rotational speed of the engine (1) via a torque control procedure.

4. The automatic engaging method for a coupling-independent power take-off (32) as recited in claim 1, further comprising:

adapting, after engagement of the power take-off (32) has been performed, the rotational speed of the engine (1) using the control unit (45) and taking account of the speed of the vehicle and the ratio of the gearbox to minimize loading on the disk clutch (3) when the disk clutch (3) is engaged.

5. The automatic engaging method for a coupling-independent power take-off (32) as recited in claim 4, wherein the control unit (45) adapts the rotational speed of the engine (1) via a torque control procedure.

6. The automatic engaging method for a coupling-independent power take-off (32) as claimed in claim 1, where the method is further characterized by the step that, after engagement of the power take-off (32) has been performed, the control unit (45) adapts the rotational speed of the engine (1) taking account of the power take-off (32) and/or taking account of equipment driven by the power take-off (32), or, if the engine (1) is stopped, the control system (45) starts the engine (1) and adapts the rotational speed of the engine (1) taking account of the power take-off (32) and/or taking account of equipment driven by the power take-off (32).

7. The automatic engaging method for a coupling-independent power take-off (32) as claimed in claim 6, where the method is further characterized by the step that the control unit (45) adapts the rotational speed of the engine (1) via a torque control procedure.

8. The automatic engaging method for a coupling-independent power take-off (32) as claimed in claim 1, where the method is further characterized by the step that, after engagement of the power take-off (32) has been performed, the control unit (45) adapts the rotational speed of the engine (1) taking account of the speed of the vehicle and the ratio of the gearbox and for the purpose of minimizing the loading on the disk clutch (3) when the disk clutch (3) is engaged.

9. The automatic engaging method for a coupling-independent power take-off (32) as claimed in claim 8, where the method is further characterized by the step that the control unit (45) adapts the rotational speed of the engine (1) via a torque control procedure.

10. An automatic engaging method for a coupling-independent power take-off (32), which power take-off (32) is driven by an internal combustion engine (1) arranged in a vehicle, which internal combustion engine (1) is connected to an automatic stage-geared gearbox (9) via an automated disk clutch (3), at least one control unit (45) being arranged in the vehicle for controlling the gearbox (9), the disk clutch (3) and the internal combustion engine (1), the engaging method being characterized by the steps:

the control unit (45) registers via a control (33), coupled to the control unit (45), for controlling the power take-off (32) that engagement of the power take-off (32) is requested;

the control unit (45) disengages the disk clutch (3) or the control unit selects a neutral position in the gearbox;

the control unit (45) controls the rotational speed of the engine (1) to idling speed or virtually idling speed or at least reduces the engine speed or stops the engine (1);

the control unit (45) engages the power take-off (32);

the control unit (45) couples the disk clutch (3) together or, if the gearbox has been put in a neutral position, reengages a gear or, if the engine (1) is stopped, starts the engine (1) before the coupling-together of the disk clutch (3) or engagement of a gear takes place, or, on condition that the vehicle is moving at sufficient speed and the correct gear is engaged, the control unit (45) staffs the engine (1) by engaging the disk clutch (3).

11. An automatic engaging method for a coupling-independent power take-off (32), which power take-off (32) is arranged directly on or adjacent to an internal combustion engine (1) arranged in a vehicle and driven by the internal combustion engine (1), which internal combustion engine (1) is connected to an automatic stage-geared gearbox (9) via an automated disk clutch (3) that is located between the power take-off (32) and the automatic stage-geared gearbox (9), at least one control unit (45) being arranged in the vehicle for controlling the gearbox (9), the disk clutch (3) and the internal combustion engine (1), the engaging method being characterized by the steps:

the control unit (45) registers via a control (33), coupled to the control unit (45), for controlling the power take-off (32) that engagement of the power take-off (32) is requested;

the control unit (45) disengages the disk clutch (3) or the control unit selects a neutral position in the gearbox;

the control unit (45) controls the rotational speed of the engine (1) to idling speed or virtually idling speed or at least reduces the engine speed or stops the engine (1);

the control unit (45) engages the power take-off (32);

the control unit (45) couples the disk clutch (3) together or, if the gearbox has been put in a neutral position, reengages a gear or, if the engine (1) is stopped, starts the engine (1) before the coupling-together of the disk clutch (3) or engagement of a gear takes place, or, on condition that the vehicle is moving at sufficient speed and the correct gear is engaged, the control unit (45) staffs the engine (1) by engaging the disk clutch (3).

* * * * *